Patented Mar. 23, 1937

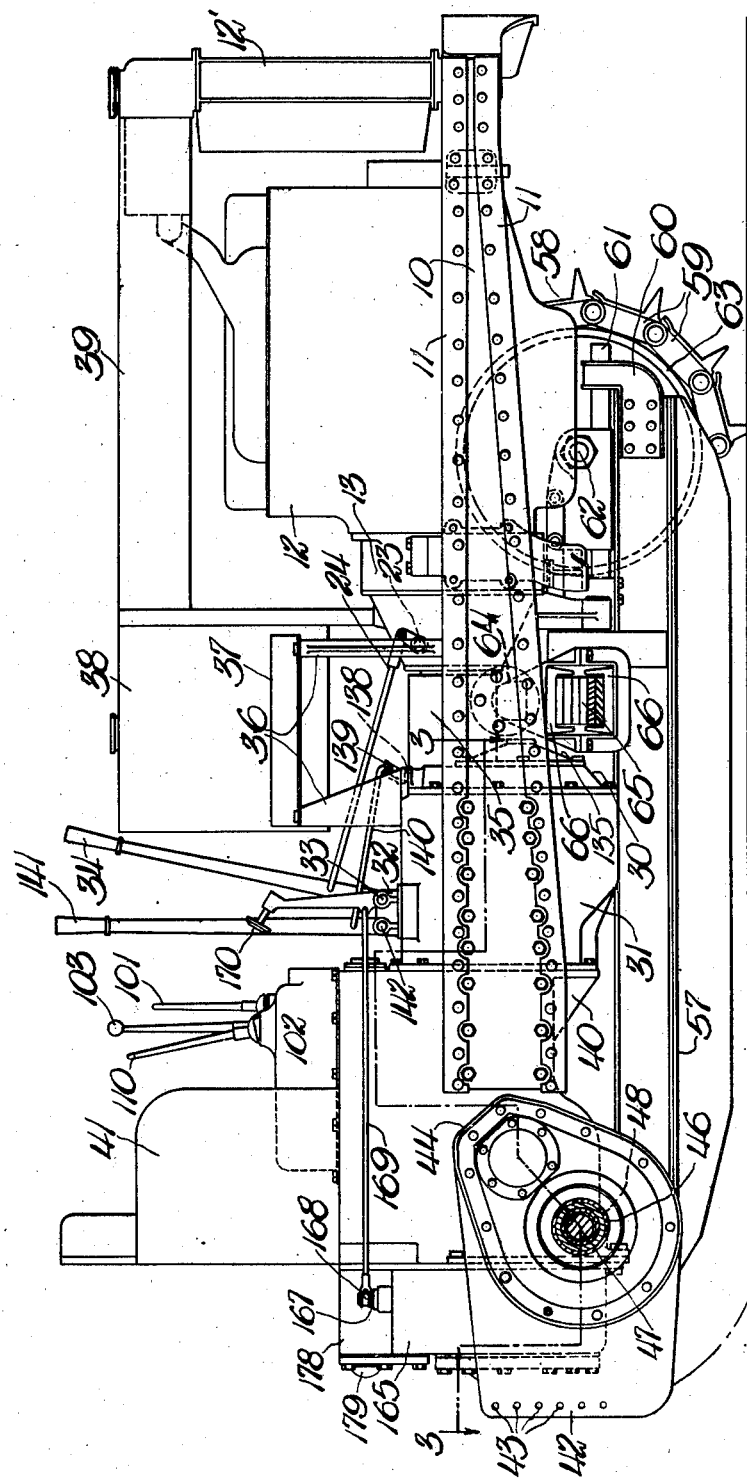

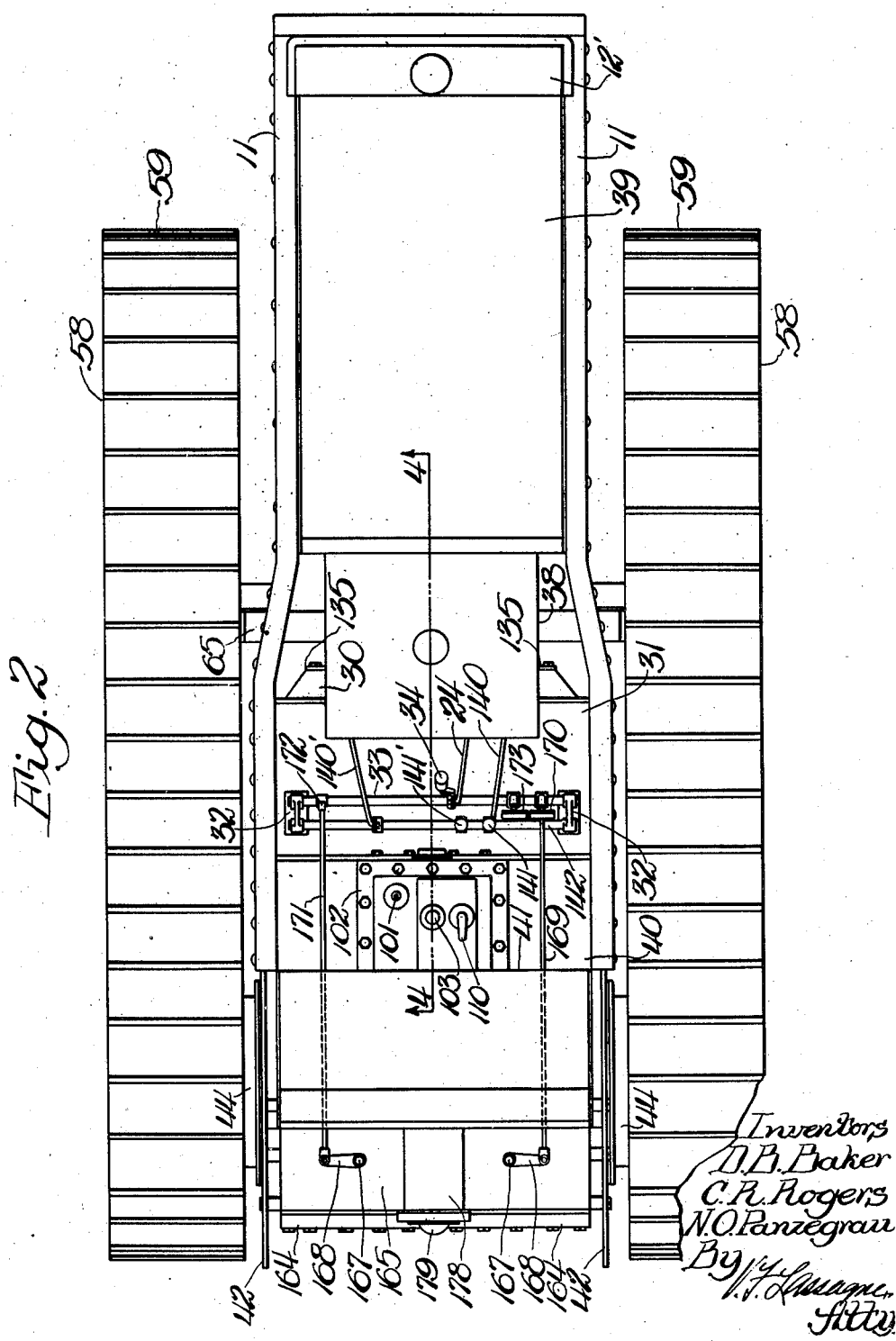

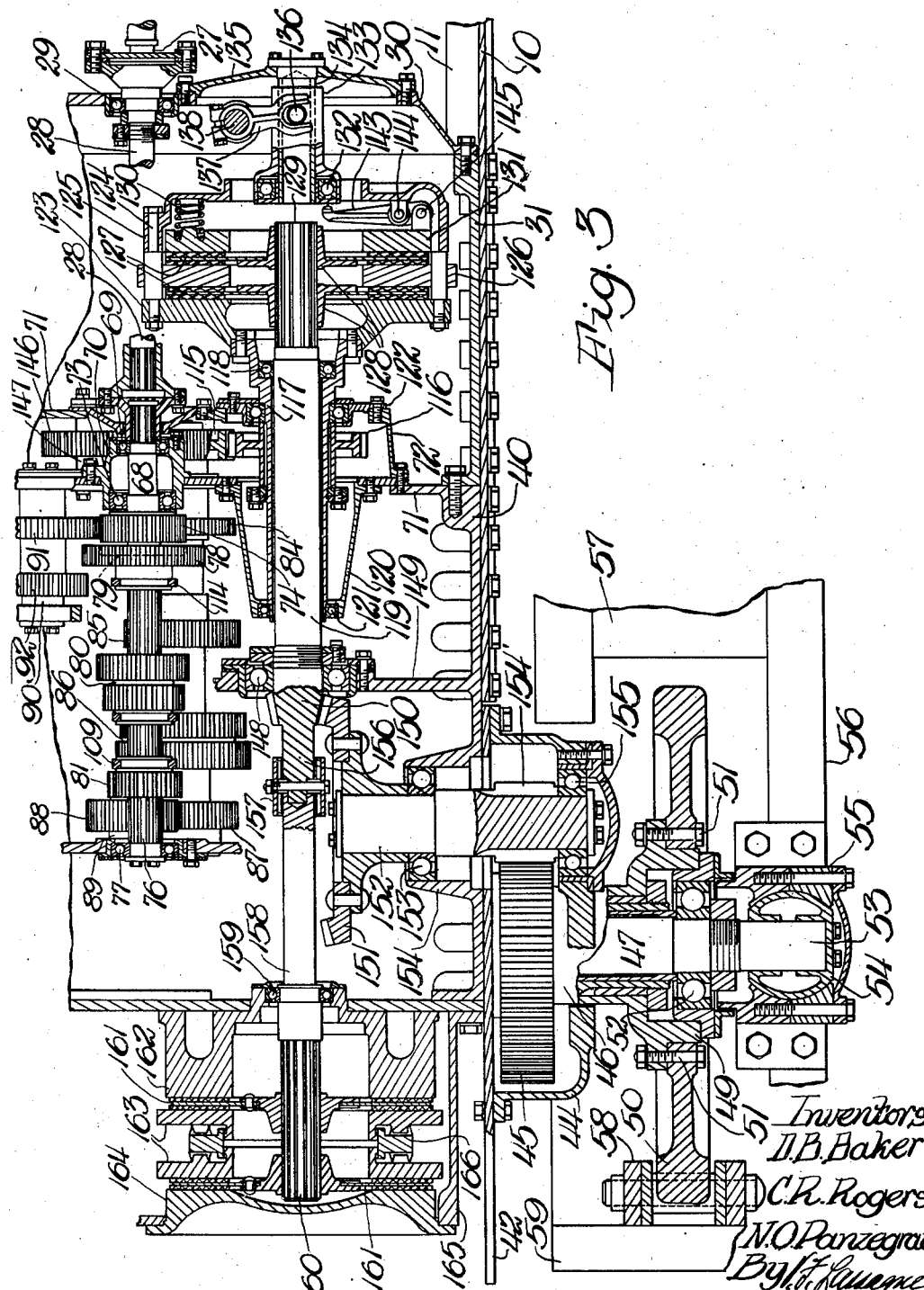

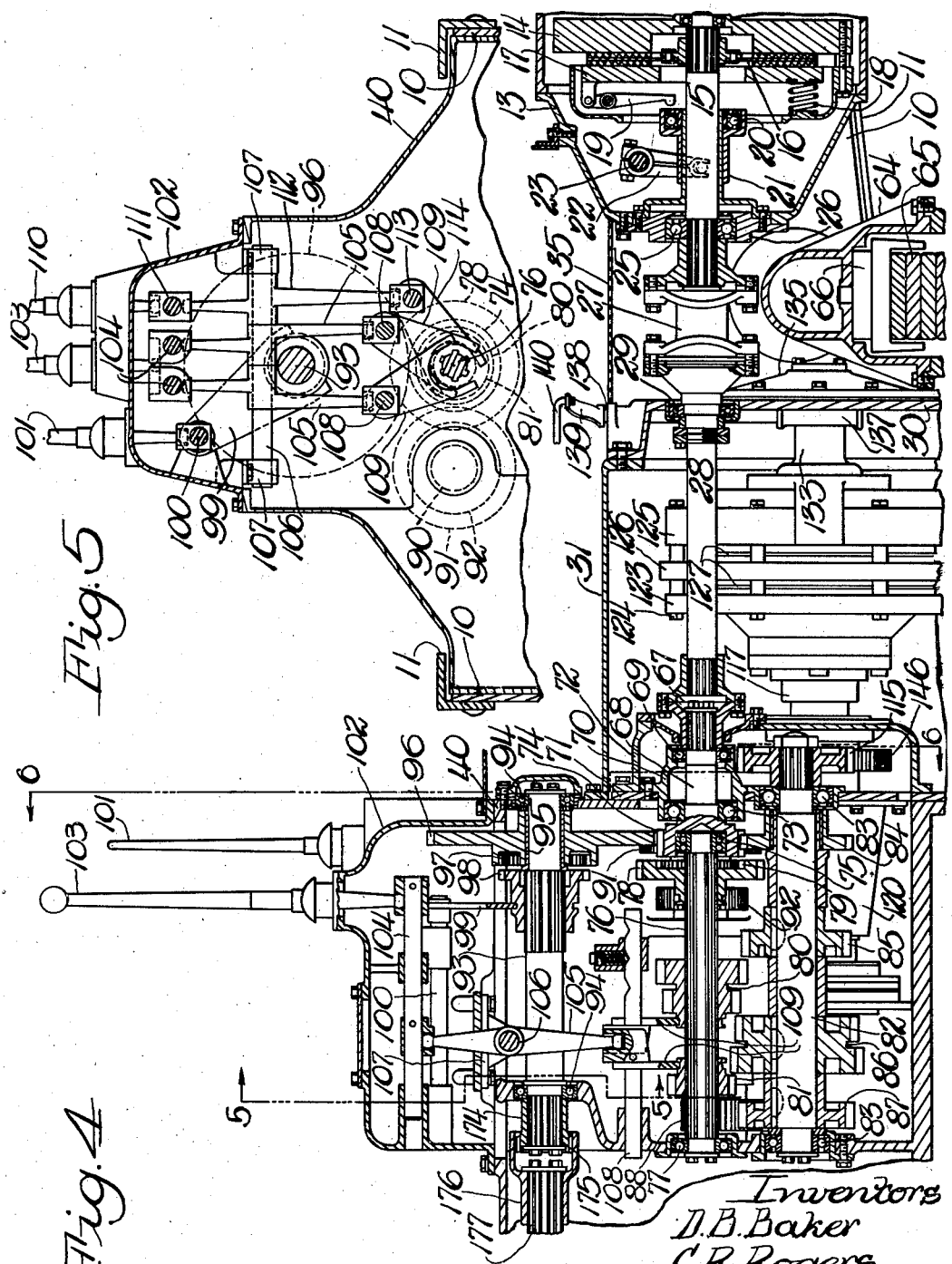

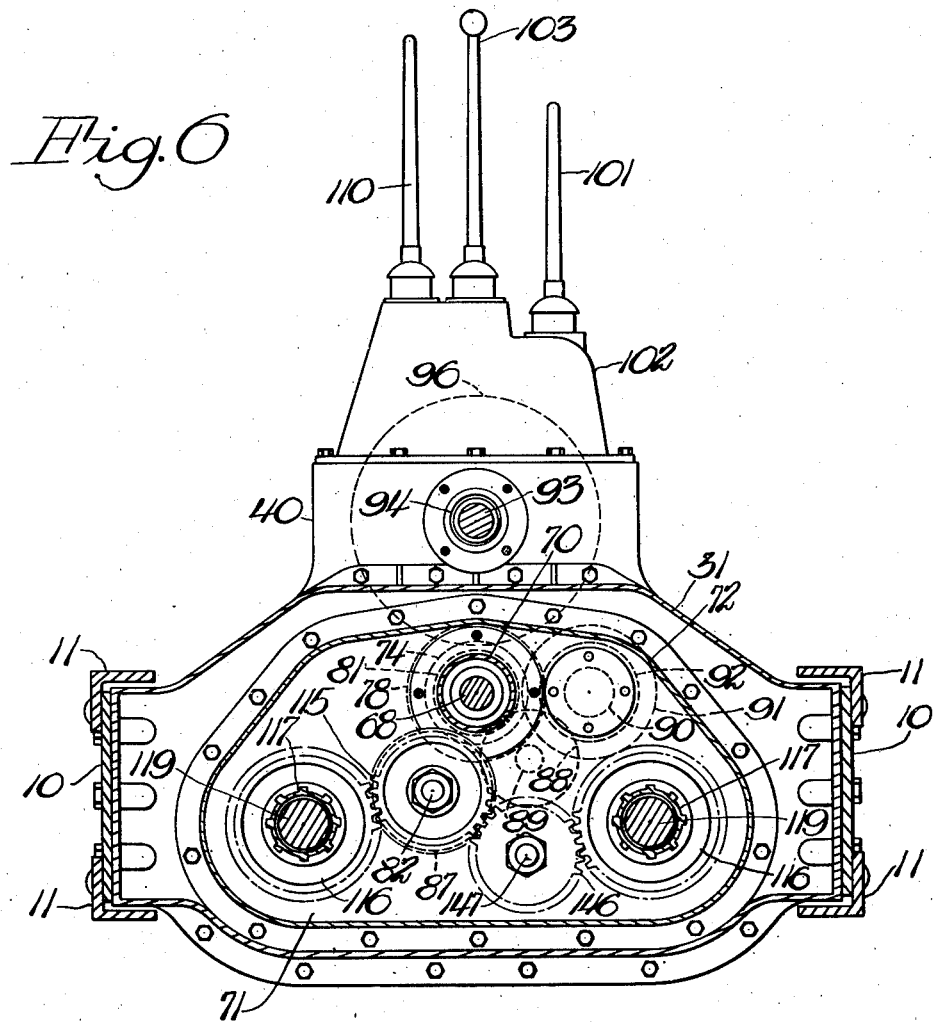
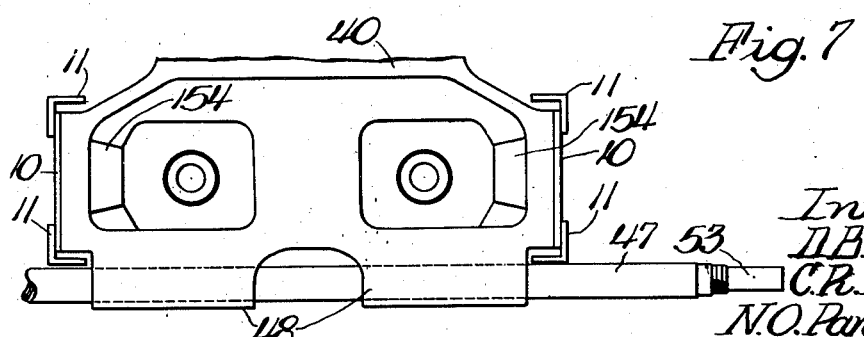

2,074,319

UNITED STATES PATENT OFFICE 2,074,319

STEERING AND DRIVING CONTROL FOR TRACTORS

David B. Baker, Riverside, Clifford R. Rogers, Oak Park, and Norman O. Panzegrau, Chicago, Ill., assignors to International Harvester Company, a corporation of New Jersey Application February 24, 1936, Serial No. 65,386

16 Claims. (Cl. 180—9.2)

This invention relates to steering and driving controls for tractors. More particularly, it relates to the provision of improved power steering and driving control means for tractors of the track type utilized in heavy duty work.

Since these heavy duty tractors are heavy and of relatively large size, it is important that the power steering and driving means be such that the tractor may be easily maneuvered. Also, since certain of the parts utilized in the driving mechanism are of relatively large size, such for example as the steering clutches, a real problem is involved in so relatively locating the parts as to result in a compact construction in which the weight of the parts will be properly balanced, so as not to affect the maneuverability and balance of the tractor. Still further, the matter of proportioning the over-all length of the tractor properly to achieve balance is also a serious problem.

Accordingly, the main object of the invention is to provide in a heavy duty type of crawler tractor an improved power steering and driving transmission mechanism.

Another object is to provide such construction in which the parts are relatively located in a novel and improved manner to achieve balance and to maintain a proper over-all length of the tractor, so as to make the same easily maneuverable.

A more specific object of the invention is to provide a novel location of a change speed gear set in relation to the final drive steering and driving control transmission parts.

Other important objects will become apparent to those skilled in the art as the disclosure is more fully made.

Generally these important objects are attained in a track type tractor of the type having a body which is longitudinally disposed and carries a suitable power plant at its front end longitudinally disposed thereon. The engine operates the usual fly-wheel at its rear end, through which power is taken through a conventional engine clutch to drive a rearwardly extending shaft that delivers the engine power into a change speed gear set disposed in a final drive transmission box. Said transmission box includes a pair of parallel, spaced, longitudinal shaft structures disposed on opposite sides of the change speed gear set for transmitting the power to transversely disposed stub axles, which may carry and drive the track driving sprocket wheels. These longitudinal, parallel shaft structures have operatively associated therewith at their forward ends hand-operated steering clutches for controlling independently the delivery of power from the engine and change speed gear set to said supplementary stub axles to control the relative speeds of the sprocket wheels in effecting driving and steering movements of the tracks on opposite sides of the tractor body. The rear end of each longitudinal, parallel shaft structure carries a hand operated brake for action upon said shaft structures to aid in augmenting and effecting steering movements of the tractor. The gist of the invention is in the relative location of these transmission parts and steering control parts with respect to each other to achieve proper balance and compactness of arrangement.

In the accompanying sheets of drawings there is illustrated a preferred and practicable example of the structure which the invention may assume in practice. In these drawings,—

Figure 1 is a general side elevational view of the entire tractor;

Figure 2 is a general plan view of the tractor;

Figure 3 is a horizontal plan view showing the driving and transmission gearing from the longitudinal center line of the tractor to one side thereof only, the section being taken substantially along the line 3—3 of Figure 1, looking in the indicated direction, it being understood that the other half of the structure on the opposite side of the median line is a duplicate of the structure shown;

Figure 4 is a general side elevational view of the transmission mechanism from the engine flywheel back, taken along the line 4—4 of Figure 2, looking in the direction of the arrows;

Figure 5 is a detail, rear elevational view, partly in section, taken along the line 5—5 of Figure 4, to illustrate the shifter lever control assembly for the change speed gear set;

Figure 6 is a detail, elevational view, looking from the front through the transmission mechanism, taken along the line 6—6 of Figure 4, looking in the direction of the arrows; and, Figure 7 is a rear elevational view of the rear transmission box with its rear cover removed, showing the mounting of the dead axle on which the track frames are pivotally mounted.

Looking at Figures 1, 2, and 6, it will be seen that the body of the tractor comprises a pair of longitudinally spaced side plates 10, which are bounded at their upper and lower edges by inturned strengthening angle bar sills 11. Carried in the forward ends of these side plates 10 and sustained therefrom in any suitable manner is the power plant 12, which preferably is of the internal combustion engine type, the usual cooling radiator therefor being indicated at 12' and also carried by the side sill structure at the front end of the motor. Since the spacing of the front ends of the side frames 10 provides an opening, the motor hangs downwardly therein, as clearly shown in Figure 1. The rear end of the motor includes the usual fly-wheel clutch and bell housing 13, which is also shown in Figure 4. The rearward end of the engine crank shaft carries and drives in the usual manner an engine fly-wheel 14 within said housing 13.

The forward end of a longitudinal clutch shaft 15 is journaled in a bearing carried by the fly-wheel, the front end of said shaft, as shown in Figure 4, being splined to carry a clutch disk 16 which includes the usual friction facings adapted to be pressed against the flywheel 14 by a clutch pressure plate 17. This pressure plate 17 is normally moved forwardly to engage the clutch 16 with the fly-wheel by means of the usual springs 18, and the clutch is releasable from the fly-wheel by means of the release fingers 19, which are moved by a release bearing 20 carried within a collar 21, which is movable by a member 22 carried on a rock-shaft 23 movable, as shown in Figure 1, by a link 24.

The shaft 15 extends rearwardly through the rear wall of the housing 13 and is journaled in a bearing 25 carried in a plate 26. The rear end of the shaft 15 is splined outside the housing 13 to carry and drive a flexible coupling member 27, which is connected with and drives a shaft extension 28 journaled in a bearing 29 carried in a cover plate 30 made fast to the front open end of a housing 31.

As shown in Figure 1, this housing 31 is preferably a cast box, which has its sides securely bolted or riveted to the side plates 10 to be suspended therein and to cross-connect the frame members 10 at this point. This box 31 is closed at its top and carries brackets 32 for mounting a cross-rock-shaft 33 on which is fulcrumed a lever 34 for operating the link 24, so that the operator can control the engine clutch 16 to release the same, when desired, from the fly-wheel 14. A shield 35, appropriately carried by the side frames 10, serves in any suitable manner to span the space between the rear end of the bell housing 13 and the front cover 30 for the box 31, to cover and enclose the coupling connection 27 between the shafts 15 and 28.

Supporting brackets 36 are carried by the frame adjacent the bell housing 13 and on the box 31 to carry side sills 37 for supporting a fuel tank 38 at the rear end of the motor 12, the same being joined in any appropriate manner with a hood 39 for the motor 12, as shown in Figure 1. The rear end of the fuel tank 38 delineates the front portion of an operator's compartment containing various control levers, such as the lever 34 already described.

The rear flanged end of the box 31 is securely bolted to the front portion of a relatively larger transmission box part 40 for enclosing a change speed gear set presently to be described and the final drive parts for delivering power to the tracks, said box 40, as shown in Figure 4, extending a considerable distance upwardly above the top of the box 31, to provide a raised part on which is mounted a seat 41 for the operator behind the control levers located in the operator's compartment. This box 40 is also preferably cast, and side frames 10 extend rearwardly past the front portion of the sides of the box 40, so that the box may be securely bolted to the side frames 10, as shown in Figure 1.

Opposite sides of the box 40 have secured thereto rearwardly extending plates 42, which extend rearwardly a substantial distance and include a series of vertical holes 43 for draw-bar attachments and the like. Carried by each plate 42 is a housing or cover plate 44, in which is journaled a large spur gear 45 including a transversely extending hollow hub 46 journaled in an opening in the outer wall of said cover, as shown in Figure 3. Passed axially through the gear 45 and the hollow hub 46 is a transversely extending dead axle 47, which, as shown in Figure 7, is carried in hollow, depending, aligned bosses 48 included in the under rear side of the transmission box 40, as shown in Figure 7. This dead axle 47 extends transversely underneath the box 40 and projects laterally with its ends respectively on opposite sides of the tractor body. This extended end of the dead axle 47 is utilized in carrying the driving sprocket wheel for the track and for pivotally mounting the track frame. Since this structure is duplicated on each side of the tractor, only one side mounting for the sprocket wheel and track frame will be described.

In Figure 3, it will be seen that the axle end 47 carries a bushing for rotatably mounting the hub 46, the outer end of said hub being enlarged, as at 49, to enable a driving sprocket wheel 50 to be secured thereto by a bolt circle 51. The enlarged portion 49 in effect forms a hub for the sprocket wheel 50, which hub is journaled on a bearing 52 carried on the axle 47. The outer, extreme end of the dead axle 47 is reduced, as at 53, and serves as a mount for a ball 54 surrounded by a socketed complementary bracket 55 to which the outer frame part 56 of a track frame 57 is rigidly connected. By means of this ball and socket joint the track frame 57 is permitted to rise and fall as well as to have slight transverse rocking movement.

The sprocket wheel 50 engages with and drives a conventional crawler track chain 58 of the endless type, on which is mounted the track shoe belt parts 59. Each track frame extends forwardly a substantial distance, as indicated in Figures 1 and 2, alongside the body of the tractor with the track frame enveloped by the endless track shoe belt 59, all in a manner common in this art. The forward end of each track frame carries a bracket including an upstanding gooseneck 60 carrying a longitudinal stationary shaft 61, which serves adjustably to slide a journal block on top of the frame 57, which journal block carries on a pivot 62 the front idler wheel 63. There is one idler wheel 63 for each track belt 59, the belt 59 enveloping the sprocket wheel 50 and an idler wheel 63 on each side of the tractor for each crawler unit. The track frame 57 is enveloped by the track belt 59 in the usual manner.

At a point substantially rearwardly from the idler wheels 63 and at a point approximately under the coupling 27 heretofore described, the main frame side members 10 have bolted thereto a transversely extending cross-connecting beam 64, which serves as a mounting underneath the body of the tractor for carrying a transverse equalizer spring bar 65, which equalizer spring bar at its center is pivoted to the member 64 on a longitudinal, central, horizontal axis, and which bar at its ends rests in appropriate guide blocks 66 carried on the respective side truck frames 57. From this description it will be seen that the body of the tractor is conventionally mounted in the well known three-point manner, whereby the necessary up and down movements of the crawler units over uneven ground is permitted without unduly warping or twisting the main frame of the tractor. The points of suspension of the body, of course, are the central pivotal hinge point between the equalizer 65 and the body and at the opposite two points of connection for each track frame part 56 at the ball and socket joint 54 on each end of the dead axle 47.

The shaft 28 heretofore described extends longitudinally rearwardly through the upper end of the compartment 31, which is a dry compartment for the enclosure of certain steering control clutches later to be described. The rear end of this shaft 28 carries a coupler 67, as shown in Figures 3 and 4, which serves to connect the shaft 28 with a rearwardly extending, longitudinal, stub shaft 68, which has its front end journaled in a bearing 69 carried in a sleeve 70 made fast in a vertical wall 71 suitably located between the compartment 31 and the compartment 40. A cover 72, suitably secured in places, serves as a partition for separating the oil compartment 40 from the dry compartment 31.

The rear end of the supporting sleeve 70 carries a bearing 73 for journaling the hub of a wide spur gear 74 located in back of the wall 71 within the compartment 40. This wide gear 74 is hollow to enclose a bearing 75 for journaling the front end of a rearwardly and longitudinally extending, splined shaft 76, which serves as the main shaft of a change speed gear set located in the lower end of the compartment 40, which now will be described.

The rear end of this main shaft of the change speed gear set is journaled in a bearing 77 mounted in the rear wall of the compartment 40. The forward end of said shaft 76 carries a shiftably mounted spur gear 78, which includes a hollow end forming a jaw clutch gear 79 adapted to be meshed with the external gear 74 for direct drive of the shaft 76 from the engine power transmitting shaft 28, with which it is in longitudinal alignment. The shaft 76 also carries a double change speed gear 80 for sliding movement thereon to provide two forward speeds, and at its rear end the shaft carries a smaller spur gear 81 slidably mounted thereon for another forward speed, as well as for establishing a reverse drive, as will later appear.

Below the shaft 76, the front and rear walls of the compartment 40 carry a longitudinal countershaft 82 having its opposite ends respectively carrying bearings 83. The forward end of this shaft 82 carries loosely on a plain bearing a spur gear 84, which merely serves as an oil dipper gear for lifting oil onto the wide spur gear 74 on the shaft 76 with which it always meshes. Appropriately keyed to the shaft 82 is a spur gear 85, with which one of the gears 80 heretofore mentioned may be meshed. The shaft 82 also carries a double gear 86, one of which may be meshed with one of the gears 80 and the other of which may be meshed with the gear 81, thus enabling the transmission of power from the shaft 76 to the shaft 82 at three different speeds. The rear end of the shaft 82 has keyed thereto a reverse gear 87. The reverse drive from the shaft 76 to the shaft 82 is established when the gear 81 is shifted into mesh with a spur gear 88 keyed to a reverse shaft 89 shown in Figure 6, which reverse gear 88 meshes with the said gear 87 on the shaft 82.

It will now be seen that in the normal operation, when the gear 78 is meshed with the gear 74 through the dog clutch 79, a range of speeds enabling three ahead and one reverse is possible. By means of auxiliary gearing now to be described it is also possible to drive the shaft 76 at a second range of speed to provide a dual range on all three speeds ahead and for the reverse drive also. This is accomplished by the provision of a dual range countershaft 90, shown in Figures 3 and 6, which shaft carries a spur gear 91 always in mesh with the spur gear 74. The shaft 90 also carries a spur gear 92, and it will now be obvious that the gear 78 on the shaft 76 can be meshed with the gear 92. For instance, in one range of speed for the shaft 76, the gear 78 will be disengaged from the gear 74, so that the torque will be transmitted from the gear 74 to the gear 91, through the shaft 90 to the gear 92 and the gear 78, with which it is meshed when said latter gear has its clutch part 79 disengaged from the gear 74, and providing, of course, that said gear 78 has been shifted back far enough to mesh the gear 92. The other, or second range is accomplished in driving the shaft 76 when the gear 78 is out of mesh with the gear 92 and the clutch part 79 is engaged with the external gear 74.

A power take-off shaft serving as a means for delivering power to be used in driving devices attached to or drawn by the tractor is shown at 93, the same being mounted in the upper end of the box 40 and extending longitudinally rearwardly with its opposite ends respectively carried in bearings 94. This shaft 93, as shown in Figure 6, is disposed above the shaft 68, 76, and at its front end carries a sleeve 95 on which is mounted an idly turning large reduction spur gear 96, which is always in mesh with the gear 74 on the shaft 68 heretofore described. This gear 96 includes a hollow jaw clutch gear hub part 97, with which may be meshed a spur gear 98 having a hub, as shown in Figure 4, which is splined onto the shaft 93 for sliding movement therealong. It will be apparent that, when the gear 98 meshes with the gear clutch 97, power will be transmitted to drive the shaft 93 from the gear 96. The gear 98 is controlled in its sliding movement from a shifter fork 99 and a sliding rod 100 operated by a shifter lever 101, which is called the power take-off control lever. As shown in Figures 4, 5, and 6, the lever 101 is mounted on a cover 102, which cover carries the shifter rod 100 and fork 99. The cover encloses the upper end of the compartment 40 and is raised a substantial distance above the top of the compartment 31, as shown in Figure 4.

The cover 102 also carries a gear shift lever 103 cooperable with a pair of shifter rods 104, which operate levers 105 pivotally mounted on a shaft 106 carried in appropriate bearings 107 supported from the cover 102. The lower ends of these levers 105 cooperate with auxiliary shifter rods 108, which in turn operate forks 109 for shifting the double gear unit 80 and the gear 81, thus making it possible in a simple and effective manner to establish driving of the power output shaft 82 of the change speed gear unit in any one of the three speeds forward or one speed reverse. The dual range for each of these three speeds ahead and one speed reverse is established by means of another lever 110 also mounted on the cover 102 to operate a shifter rod 111, which operates a lever 112 also journaled on the shaft 106 and carried by the cover 102. The lower end of the lever 112 slides a rod 113, which in turn operates a yoke or fork 114 for shifting the gear 78 to establish the drive of the shaft 76 in either one of the two ranges of speed, as has heretofore been described.

As shown in Figure 4, the front end of the power output shaft 82 of the change speed gear set is extended forwardly of the bearing 83 inside the cover 72 where it carries fast thereon a spur gear 115 shown also in Figure 6. The gear 115 to one side of its periphery, as shown in Figure 6, meshes with a spur gear 116, which is keyed to a longitudinally extending sleeve 117 journaled at its front end on a bearing 118 carried on a longitudinally extending steering and driving control shaft 119, as shown best in Figure 3. A bracket 120 is securely bolted to the wall part 71 to provide at its rear end a bearing mount for a bearing 121, that serves to journal the rear end of said sleeve 117. The sleeve is also carried in a large bearing 122 mounted in the cover part 72.

Connected to turn with the sleeve 117 is a plate 123 carrying a bolt circle 124 for mounting a plate 125 to turn with the plate 123. This plate structure 123 and 125 is part of a disk friction clutch which includes an intermediate plate 126. Between said plate 126 and each of the plates 123 and 125 are friction faced clutch disks 127 carried on hubs 128 securely fastened to the front end of the shaft 119, which is splined, as shown at 129. The usual circle of springs 130 backed against the plate 125 serves to press the plates 123 and 126 into engagement with the friction face on the clutch disk 127 through the intermediary of the usual clutch pressure plate 131. In other words, this clutch is normally applied by the springs 130, so that the rotation of the sleeve 117 through the gear 116 is caused to be transmitted through the clutch for rotating the shaft 119. The clutch may be released to disconnect the shaft 119 from the sleeve 117 by means of a conventional clutch release bearing 132 carried in a clutch release collar 133 mounted on a shaft 134 carried in a plate 135 secured to the cover plate 30 for the box compartment 31. The collar 133 carries the usual trunnions 136 engaged by a crank arm 137 rockable by a shaft 138.

Said shaft 138 is vertically disposed and appropriately journaled in the cover 30, as shown in Figure 4, the upper end thereof carrying a crank 139 swingable by means of a link 140, which connects with a hand lever 141 rockably mounted on a shaft 142 carried on the supporting bracket 32 on top of the box part 31 of the transmission, heretofore described. Through the hand lever 141, the shaft 138 may be rocked to shift the clutch release collar 133 to press the bearing 132 carried thereby against the usual plurality of clutch release levers 143 shown in Figure 3, which are pivotally mounted at 144 to the plate 125 intermediately of their ends. The other ends of these levers, only one of which is shown, are pivoted at 145 to the clutch pressure plate 131. It can be seen that, when the bearing 132 presses against the upper end of the lever 143, shown in Figure 3, through the mechanism described, the pressure plate 131 is moved forwardly against the springs 130 to release the clutch to stop rotation of the shaft 119.

The structure just described, embodying the sleeve shaft 117 and the coaxial solid shaft 119 with the clutch structure 127 operatively associated therewith for connecting and disconnecting these two shafts with respect to one another, is duplicated on the opposite side of the tractor, since there are two tracks and each is controllable by means of the mechanism just described on one side of the tractor, as shown in Figure 3. For instance, looking at Figure 6, it will be seen that the spur gear 115 drives an idler gear 146 mounted on a suitable stub shaft 147 appropriately mounted, which spur gear 146 meshes with and drives a gear also numbered 116 since it is the same as the gear 116 heretofore described. A second longitudinally extending shaft 119 is provided on this side of the tractor in parallelism with the shaft 119 previously described. It will thus be understood that there are two parallel longitudinal shafts 119 arranged one on each side of the rear transmission parts and each includes a sleeve shaft and a steering clutch exactly in the manner heretofore described. For that reason it has not been deemed necessary to duplicate a description of the opposite side of the steering clutch mechanism for the tracks.

The intermediate idler spur gear 146 is provided so that the two shafts 119 will rotate in opposite directions, so that, as will later appear, both tracks will be driven in the same direction. The second clutch 127 is controlled by a second lever 141' appropriately mounted on the shaft 142 by means of a link 140'. One lever 141 will be loose on the shaft 142 and the other one will be fast on the shaft, so that the two levers and the two clutches may be operated independently of each other. While only one shaft 119 is shown in Figure 3, it will be understood that both sides of the tractor steering control mechanism are the same and that the rear end of each shaft 119 is journaled in a bearing 148 appropriately mounted in a vertical wall 149 cast or otherwise located in the transmission box part 40. The rear end of each shaft 119 projects through its bearing 148 and through the wall 149, where it carries a bevel pinion 150. The bevel pinion 150 on the rear end of each shaft 119 respectively meshes with a large bevel gear wheel 151 made fast to transverse stub axles 152. These two stub axles 152, it will be understood, are transversely aligned and each is journaled in a bearing 153 appropriately carried in transverse hub portions 154 formed in the side walls of the box part 40. Each stub axle 152 projects laterally out of the side of the box 40, where it carries a spur gear 154 respectively meshing with the large spur gears 45 heretofore described. An appropriate bearing 155 journals the outer ends of the stub shafts 152 in the cover 44 heretofore described.

Each shaft 119, rearwardly of its bevel gear 150, is reduced as an integral extension 156 connected with a removable coupling device 157 to a shaft continuation 158, said shaft extension 158 being journaled in bearings 159 in the rear wall of the box part 40. These two shafts 158 extend rearwardly through the rear wall of the box 40 and have their projected ends spline finished, as at 160, for the purpose of carrying a pair of clutch disk plates 161, which rotate with the shafts 160. A brake block 162 is stationarily mounted on the rear wall of the box 40 surrounding each shaft end 160, so that a pair of pressure plates 163 will serve to spread the disks 161, with the friction faces on one disk 161 clamped between one wall of the pressure member 163 and the block 162, and with the other face of the member 163 serving to clamp the other clutch disk 161 against a stationarily mounted cover 164 carried securely in a large circular opening formed in the rear wall of a cover member 165 secured to the rear wall of the box 40 for the purpose of enclosing these clutch brakes.

There is one double clutch brake, as shown in Figure 3, for each shaft 158, said members 163 being spread apart for the purpose of clamping the clutch brake plates by means of a rotatably cam ring 166 operable in any appropriate manner by means of vertical rockshafts 167 journaled in the cover 165, which rockshafts are appropriately operable, as shown in Figure 2, by means of cranks 168. One of the cranks 168 is connected through a link 169 with a foot pedal 170 rockably mounted on the shaft 33 heretofore described.

The other crank 168 is operable by means of a link 171 connected with a crank 172 rockable with the shaft 33 that carries a foot pedal 173 also rockable with the shaft 33. It will now be seen that the two foot pedals 170 and 173 may be used for independently operating the connections 169 and 171 for independent operation of the two clutch brake structures 161 just described.

The power take-off shaft 93 heretofore described has a rear splined end in back of the bearing 94, which carries a splined collar 174, which includes a jaw clutch structure 175 removably coupled to a complementary sleeve 176 on the front splined end of a power take-off shaft extension 177, which extension 177 passes rearwardly through an appropriately shaped upper portion 178 of the rear clutch brake housing 165.

A cap 179 is removably mounted over the rear end of the extension shaft 177 to make said shaft available for the usual power take-off purposes in a manner well understood in this art.

This completes the detail description of the structure of the tractor.

In use and operation, the crank shaft of the motor, of course, transmits torque through the fly-wheel 14 and shaft 15, since the clutch 16 is normally engaged to drive the engine extension shaft 28 and cause rotation of the main shaft 76 of the change speed gear set. In either one of two ranges, by positioning of the shiftable gears heretofore described and in the conventional manner, the countershaft 82 of the change speed gear set may be driven ahead at three different speeds and in two different ranges, as may be desired. Also the countershaft 82 may be driven reversely in either one of two speeds provided by the dual range mechanism heretofore amply described. The torque is delivered out of the change speed gear set to the spur gear 115, which, as shown in Figure 6, transmits the power to the two gear wheels 116, which are caused to rotate in opposite directions in the manner indicated by the arrows in Figure 6. The steering clutches on the shafts 119 are normally engaged by their clutch springs 130 to cause the hollow shafts 117 to rotate. This causes rotation of the shafts 119 and the bevel gears 150 at their rear ends, which in turn drive the two large bevel wheels 151 to turn the shaft or stub axles 152. These transverse stub axles 152 in turn drive the spur gears 154', and they in turn drive the large spur gears 45, which include the hubs 46 and the sprocket wheels 50, to rotate the latter in the same direction, thereby propelling the two tracks.

The clutch brakes 161, it is to be understood, are normally held out of engagement in any appropriate manner, so that no resistance is applied to the free rotation of the shafts 158 with the shafts 156 or 119, which is the condition of operation during normal straightaway operation of the tractor.

When it is desired to turn the tractor to steer the same, the clutch 127 on the right hand side is released by the hand lever 141 to interrupt the transmission of power to the shaft 119, so that no driving torque is transmitted to the right hand driving sprocket wheel 50 and the right hand track, with power continuing to be delivered through the left hand parallel shaft 119 by its clutch 127, which has not been released, the left hand track continues to be driven and, as a result, the tractor turns to the right, if it is desired to steer the tractor in that direction.

Turning movement of the tractor in the opposite or left hand direction is achieved by releasing the left hand clutch 127 and by allowing the right hand clutch 127 to remain engaged. The opposite condition then prevails with the right hand side being driven and the left hand side being idle, so that the right hand track drives the tractor to the left. These steering movements can be varied by slipping the steering clutches, if desired.

For very abrupt turns and to overcome any inertia of momentum that may be present in any of the rotating parts when one of the clutches has been released, the clutch brake 161 is applied by one of the foot pedals described to augment the steering action. Thus, if the tractor is to turn sharply to the right, the right hand steering clutch will be released and at the same time the right hand clutch brake will be applied, thus stopping transmission of power to the right hand track and at the same time abruptly braking any tendency toward continued momentum of the rotationg parts on the right hand side of the driving mechanism.

It can be seen that the relative location of parts for use in a heavy duty crawler tractor is very compact and that the change speed gear set is so placed with respect to the longitudinal parallel shafts 119 that it does not interfere in any manner whatsoever with the locating and positioning of the relatively large steering clutches 127, which must be used due to the large size and great weight of the tractor. It will be noted that these steering clutches are positioned on opposite sides of the longitudinal median line of the tractor and in a dry clutch compartment 31 forwardly of the change speed gear set.

Further, the steering control clutch brakes 161, which also are necessarily of relatively large diameter, are mounted in a dry compartment in back of the rear wall of the transmission box part 40, or generally at the opposite end of the driving shaft 119 where the large steering clutches 127 are mounted. Generally these clutch brakes 161 are located on opposite sides of the median line of the tractor rearwardly of the change speed gear set. This compact arrangement is the most important factor in reducing the over-all length of the tractor, if the change speed gear set were to be conventionally located in a position forwardly of the final drive parts instead of being compactly associated therewith, as taught by the present invention. Further, it is important to note that proper weight distribution results from the present arrangement which makes for proper balance of the entire tractor and the manner of distributing its dead weight through the three point suspension heretofore described onto the crawler units.

The parts of the change speed mechanism, of course, obviously are quickly accessible for repair and inspection by removal of the cover 102, and similarly the removal of the rear plates 164 or the entire rear cover 165 makes the clutch brake plates quickly accessible for repair and adjustment. The entire structure has been designed from the standpoint of accessibility of all parts for repairs and inspection and from the standpoint of economical manufacture and assembly.

It is the intention to cover all changes and modifications of the illustrative example of the invention described and shown, which do not depart from the spirit and scope of the invention as heretofore claimed.

What is claimed is:

1. The combination with a tractor having a longitudinal body including a transmission box at its rear end having a front wall and side walls, a pair of transversely aligned stub axles respectively carried in the side walls of the box including means for driving opposite traction supports mounting the rear end of the body, a longitudinal shaft journaled in the box at each side thereof and extending the length of said box, each shaft having a driving connection with the adjacent stub axle, a sleeve freely turnable on each shaft, a normally engaged clutch between each sleeve and associated shaft, a change speed gear set located in the box between said two sleeves including a power output shaft carrying a gear, means driving the two sleeves from said gear, a motor on the body having connections for driving the change speed gear set, means for independently controlling the clutches for regulating the drive to said stub axles, and a compartment included in the body in advance of the change speed gear set separate from the transmission box but connected thereto, said clutches being located in said compartment with the shafts and associated sleeves extending at their front ends forwardly through the front wall of the box and into said clutch compartment, said change speed gear set being located rearwardly of the clutch compartment.

2. The combination with a tractor having a longitudinal body including a transmission box at its rear end having a front wall and side walls, a pair of transversely aligned stub axles respectively carried in the side walls of the box including means for driving opposite traction supports mounting the rear end of the body, a longitudinal shaft journaled in the box at each side thereof and extending the length of said box, each shaft having a driving connection with the adjacent stub axle and extending forwardly through said front wall, a sleeve freely turnable on the front end of each shaft and also extending forwardly through said front wall, a normally engaged clutch between each sleeve and associated shaft, a change speed gear set located in the box between said two sleeves including a longitudinal power output shaft journaled in the box and carrying a gear near its front end, means driving the two sleeves from said gear, a motor on the front end of the body having connections for driving the change speed gear set, means for controlling the clutches for regulating the drive to said stub axles, a compartment included in the body in advance of the change speed gear set and the front wall of the transmission box separate from the transmission box but connected thereto, said clutches being located in said compartment and ahead of the change speed gear set.

3. The combination with a tractor having a longitudinal body including a transmission box at its rear end having a front wall and side walls, a pair of transverse stub axles respectively carried in the side walls of the box including means for driving opposite traction supports mounting the rear end of the body, a longitudinal shaft journaled in the box at each side thereof and extending the length thereof with their front ends projecting forwardly through the front wall, each shaft having a driving connection with the adjacent stub axle, a sleeve freely turnable on each shaft, said sleeves also extending forwardly through said front wall, a normally engaged clutch between each sleeve and associated shaft, a change speed gear set located in the box rearwardly of the front wall and between said two sleeves at their rear ends and including a power output shaft carrying a gear, means driving the two sleeves from said gear and in opposite directions, a motor on the body having connections for driving the change speed gear set, means for controlling the clutches for regulating the drive to said stub axles, a compartment included in the body in advance of the front wall and change speed gear set, said clutches being located in said compartment, a normally disengaged brake carried on the rear end of each longitudinal shaft outside and to the rear of said box, and means for controlling the brakes to apply same for restraining rotation of the shafts.

4. The combination with a tractor having a longitudinal body including a transmission box at its rear end, a pair of transverse stub axles respectively carried in the side walls of the box including means for driving opposite traction supports mounting the rear end of the body, a longitudinal shaft journaled in the box at each side thereof, each shaft having a driving connection with the adjacent stub axle, a sleeve freely turnable on the front end of each shaft, a normally engaged clutch between each sleeve and associated shaft, a change speed gear set located in the box between said two sleeves including a power output shaft carrying a gear, means driving the two sleeves from said gear and in opposite directions, a motor on the body having connections for driving the change speed gear set, means for controlling the clutches for regulating the drive to said stub axles, a compartment included in the body in advance of the change speed gear set separated from the transmission box but connected thereto, said clutches being located in said compartment, the longitudinal shafts each having detachably connected thereto rearwardly of their driving connection with the stub axles a rearward and coaxial extension shaft, and a normally released brake carried on each shaft extension including means for app'ying same to restrain rotation of the longitudinal shafts.

5. The combination with a tractor having a longitudinal body including a transmission box at its rear end, a pair of transverse stub axles respectively carried in the side walls of the box including means for driving opposite traction supports mounting the rear end of the body, a longitudinal shaft and sleeve structure journaled in the box on each side thereof, said structure respectively having a driving connection with an adjacent stub axle, clutch means included in and located at the front end of each of said structures, a change speed gear set located in the box between said two sleeves including a power output shaft carrying a gear, means driving the structures from said gear, a motor on the body having connections for driving the change speed gear set, and brake means included in and located at the rear ends of the shaft and sleeve structures for restraining the drive to the stub axles, the clutch means being located forwardly of and the brake means rearwardly of said change speed gear set.

6. The combination with a tractor having a longitudinal body including a rear transmission box, of a clutch compartment connected to the box in advance thereof and a brake compartment connected to the box to the rear of said box, the clutch and brake compartments being dry while the box is adapted to contain lubricant, a motor carried on the body, a change speed gear set operatively connected with the motor to be driven thereby and carried along the longitudinal median line of the body within said box, a pair of parallel longitudinal shafts journaled in the box with one disposed on each side of the change speed gear set, each shaft carrying near its front end a sleeve including a clutch located in the clutch compartment for normally locking the sleeves for rotation with the shafts, means for driving the sleeve shaft structures from an element of the change speed gear set, a pair of transverse stub axles respectively carried by the box and including means to drive same from the proximate shaft, opposite traction devices supporting the body and driven respectively from said axles, and a brake operatively associated with the rear end of each shaft and located within the brake compartment.

7. The combination with a tractor having a longitudinal body including a rear transmission box, of a clutch compartment connected to the box in advance thereof and a brake compartment connected to the box to the rear of said box, the clutch and brake compartments being dry while the box is adapted to contain lubricant, a motor on the front end of the body, a change speed gear set operatively connected with the motor to be driven thereby and carried along the longitudinal median line of the body within said box, a pair of parallel longitudinal shafts journaled in the box with one disposed on each side of the change speed gear set, each shaft carrying near its front end a sleeve including a clutch located in the clutch compartment for normally locking the sleeves for rotation with the shafts, means for independently releasing the clutches, means for driving the sleeve shaft structures from an element of the change speed gear set and in opposite directions, a pair of transverse aligned stub axles respectively carried by the box and including means to drive same from the proximate shaft, opposite traction devices supporting the body and driven respectively from said axles, and a brake operatively associated with the rear end of each shaft and located within the brake compartment.

8. The combination with a tractor having a longitudinal body including a rear transmission box, of a clutch compartment connected to the box in advance thereof and a brake compartment connected to the box to the rear of said box, the clutch and brake compartments being dry while the box is adapted to contain lubricant, a motor on the front end of the body, a change speed gear set including a longitudinal power output shaft, said gear set being operatively connected with the motor to be driven thereby and carried along the longitudinal median line of the body within said box, a pair of parallel longitudinal shafts journaled in the box with one disposed on each side of the change speed power output shaft, each shaft carrying near its front end a sleeve including a clutch located in the clutch compartment for normally locking the sleeves for rotation with the shafts, means for releasing the clutches, a gear on the front end of the power output shaft for driving the sleeve shaft structures from an element of the change speed gear set and in opposite directions, a pair of transverse stub axles respectively carried by the box and including means to drive same from the proximate shaft, opposite traction devices supporting the body and driven respectively from said axles, a normally disengaged brake operatively associated with the rear end of each shaft and located within the brake compartment, and means to apply the brakes.

9. The combination with a tractor having a longitudinal body including a rear transmission box, of a clutch compartment connected to the box in advance thereof and a brake compartment connected to the box to the rear of said box, the clutch and brake compartments being dry while the box is adapted to contain lubricant, a motor carried on the body, a change speed gear set operatively connected with the motor to be driven thereby and carried along substantially the longitudinal median line of the body within said box, a pair of longitudinal shafts journaled in the box with one disposed on each side of the change speed gear set, each shaft carrying near its front end a sleeve including a clutch located in the clutch compartment for normally locking the sleeves for rotation with the shafts, means for driving the sleeve shaft structures from an element of the change speed gear set, a pair of transverse stub axles respectively carried by the box and including means to drive same from the proximate shaft, opposite traction devices supporting the body and driven respectively from said axles, a normally disengaged brake operatively associated with the rear end of each shaft and located within the brake compartment, lever mechanism carried on the box including connections for releasing the clutches, and other lever mechanism carried on the box including connections for applying the brakes.

10. The combination with a tractor having a longitudinal body including a rear transmission box, of a clutch compartment connected to the box in advance thereof and a brake compartment connected to the box to the rear of said box, a motor on the front end of the body, a change speed gear set operatively connected with the motor to be driven thereby and carried along substantially the longitudinal median line of the body within said box, a pair of longitudinal shafts journaled in the box with one disposed on each side of the change speed gear set, each shaft carrying near its front end a sleeve including a clutch located in the clutch compartment for normally locking the sleeves for rotation with the shafts, means for independently releasing the clutches, means for driving the sleeve shaft structures from an element of the change speed gear set and in opposite directions, a pair of transverse aligned stub axles respectively carried by the box and including means to drive same from the proximate shaft, opposite traction devices supporting the body and driven respectively from said axles, each shaft having a coaxial extension shaft detachably connected thereto and extending rearwardly through the brake compartment, and a normally disengaged brake including means for applying same located within the brake compartment and operatively associated with said shaft extensions.

11. The combination with a tractor having a longitudinal body including a rear transmission box, of a clutch compartment connected to the box in advance thereof and a brake compartment connected to the box to the rear of said box, a motor on the front end of the body, a change speed gear set operatively connected with the motor to be driven thereby and carried along the longitudinal median line of the body within said box, a pair of parallel longitudinal shafts journaled in the box with one disposed on each side of the change speed gear set, each shaft carrying a sleeve including a clutch located in the clutch compartment for normally locking the sleeves for rotation with the shafts, means for releasing the clutches, means for driving the sleeve shaft structures from an element of the change speed gear set and in opposite directions, a pair of transverse stub axles respectively carried by the box and including means to drive same from the proximate shaft, opposite traction devices supporting the body and driven respectively from said axles, a normally disengaged brake operatively associated with the rear end of each shaft and located within the brake compartment, and means for applying the brakes.

12. The combination with a tractor having a longitudinal body including a rear transmission box, of a clutch compartment connected to the box in advance thereof and a brake compartment connected to the box to the rear of said box, a motor on the front end of the body, a change speed gear set operatively connected with the motor to be driven thereby and carried along substantially the longitudinal median line of the body within said box, a pair of parallel longitudinal shafts journaled in the box with one disposed on each side of the change speed gear set, each shaft carrying near its front end a sleeve including a clutch located in the clutch compartment for normally locking the sleeves for rotation with the shafts, said clutches being located in advance of and on opposite sides of the gear set, means for driving the sleeve shaft structures from an element of the change speed gear set and in opposite directions, a pair of transverse stub axles respectively carried by the box and including means to drive same from the proximate shaft, opposite traction devices supporting the body and driven respectively from said axles, a normally disengaged brake operatively associated with the rear end of each shaft and located within the brake compartment rearwardly of the gear set and on opposite sides thereof, means for releasing the clutches, and other means for applying the brakes.

13. The combination with a tractor having a longitudinal body carrying a motor and formed at its rear end to enclose and carry transmission and control gearing for driving opposite traction devices on which the body is supported, of a transmission including a pair of transverse stub axles journaled in the body at its rear end for driving the traction devices, a longitudinal drive shaft journaled in the body at each side thereof, said shafts respectively geared to drive a stub axle, a sleeve operatively associated with each shaft and including a steering and driving clutch normally engaged for locking each sleeve with its proximate shaft, a change speed gear set driven from the motor and including a power output shaft longitudinally disposed and located between said longitudinal drive shafts, means for driving said longitudinal drive shafts from the power output shaft, and a brake operatively associated with the rear end of each longitudinal drive shaft, the clutches being located in advance of said change speed gear set and the brakes being located to the rear of said gear set.

14. The combination with a tractor having a longitudinal body carrying a motor at its forward end and formed at its rear end to enclose and carry transmission and control gearing for driving opposite traction devices on which the body is supported, of a transmission including a pair of transverse aligned stub axles journaled in the body at its rear end for driving the traction devices, a longitudinal drive shaft journaled in the body at each side thereof, said shafts respectively geared to drive a stub axle, a sleeve operatively associated with each shaft at its front end and including a steering and driving clutch normally engaged for locking each sleeve with its proximate shaft, a change speed gear set driven from the motor and located between the longitudinal shafts, said gear set including a longitudinal power output shaft also located between said longitudinal drive shafts, means for driving said longitudinal drive shafts from the power output shaft, a brake operatively associated with the rear end of each longitudinal shaft, the clutches being located in advance of said change speed gear set and the brakes being located rearwardly of said gear set, means for controlling the clutches, and means for operating the brakes.

15. The combination with a tractor having a longitudinal body carrying a motor and formed at its rear end to enclose and carry transmission and control gearing for driving opposite traction devices on which the body is supported, of a transmission including a pair of transverse aligned stub axles journaled in the body at its rear end for driving the traction devices, a longitudinal shaft journaled in the body at each side thereof, said shafts respectively geared to drive a stub axle, a sleeve operatively associated with each shaft at its front end and including a steering and driving clutch normally engaged for locking each sleeve with its proximate shaft, a change speed gear set driven from the motor and located between said longitudinal shafts, means for driving said longitudinal shafts from an element of the change speed gear set, a brake operatively associated with the rear end of each longitudinal shaft rearwardly of the change speed gear set, and a longitudinal rearwardly extended power take-off shaft driven from the change speed gear set and disposed thereabove.

16. The combination with a tractor having a longitudinal body carrying a motor and formed at its rear end to enclose and carry transmission and control gearing for driving opposite traction devices on which the body is supported, of a transmission including a pair of transverse stub axles journaled in the body at its rear end for driving the traction devices, a longitudinal power shaft journaled in the body at each side thereof, said shafts respectively geared to drive a stub axle, a sleeve operatively associated with each shaft and including a steering and driving clutch normally engaged for locking each sleeve with its proximate shaft, a change speed gear set driven from the motor and including a power output shaft longitudinally disposed and located between said longitudinal power shafts, means for driving said longitudinal shafts from the power output shaft, means included in the change speed gear set for driving the power output shaft at a second speed range, a brake operatively associated with the rear end of each longitudinal shaft rearwardly of the change speed gear set, and a longitudinally rearwardly extended power take-off shaft driven from the change speed gear set and disposed thereabove, said power take-off shaft being disposed on the longitudinal median line of the tractor above and between said brakes.

DAVID B. BAKER,
CLIFFORD R. ROGERS.
NORMAN O. PANZEGRAU.